Feb. 18, 1958 J. W. GRAY ET AL 2,823,585
BOMBING SYSTEM
Filed June 7, 1945 4 Sheets-Sheet 1

INVENTORS
JOHN W. GRAY
IVAN A. GREENWOOD JR.
BY
William D. Hall,
ATTORNEY

Feb. 18, 1958  J. W. GRAY ET AL  2,823,585
BOMBING SYSTEM
Filed June 7, 1945  4 Sheets-Sheet 2

INVENTORS
JOHN W. GRAY
IVAN A. GREENWOOD JR.
BY
William D. Hall
ATTORNEY

Feb. 18, 1958  J. W. GRAY ET AL  2,823,585
BOMBING SYSTEM
Filed June 7, 1945
4 Sheets-Sheet 3

INVENTORS
JOHN W. GRAY
IVAN A. GREENWOOD JR.
BY
William D. Hall
ATTORNEY

Feb. 18, 1958

J. W. GRAY ET AL 2,823,585

BOMBING SYSTEM

Filed June 7, 1945

INVENTORS
JOHN W. GRAY
BY   IVAN A. GREENWOOD JR.

ATTORNEY

United States Patent Office 2,823,585
Patented Feb. 18, 1958

2,823,585

BOMBING SYSTEM

John W. Gray, Cambridge, and Ivan A. Greenwood, Jr., Boston, Mass., assignors, by mesne assignments, to the United States of America as represented by the Secretary of War Application June 7, 1945, Serial No. 598,161

8 Claims. (Cl. 89—1.5)

This invention relates in general to electrical apparatus, and more particularly to electrical apparatus used for aerial navigation and blind bombing.

The navigation of aircraft is frequently a complicated and difficult procedure because certain important items of information such as wind velocity and direction are unavailable. It is an object of this invention to provide continuous accurate information as to the location of the aircraft with respect to a given origin of ground coordinates.

The bombing of targets at night or through overcast, smoke and the like by means of radio object detection apparatus is frequently inaccurate and ineffective due to the difficulty of recognizing targets as shown on the screen of a cathode ray tube indicator, and because the specified target may not be of such a character as to give a sufficiently strong echo to be visible on the screen. Further objects of this invention are to give positive identification of targets giving adequate returns, and to make possible the bombing of targets giving inadequate return, by offset from some other object giving a strong return.

In level bombing by visual means, aircraft are usually required to fly a straight level course for an appreciable time prior to release of the bombs. This is a distinct disadvantage in that enemy anti-aircraft fire can be accurately directed during this period. It is a still further object of this invention to make possible a material reduction in the required duration of the straight bombing run, by determining and entering some or all of the required items of information, such as wind velocity into the equipment prior to the bombing run.

In bombing over enemy territory, it occasionally happens that the radio echo detection equipment falls just before or during the bombing run, due to enemy action or for other reasons. It is a still further object of this invention to make possible the continuation of the bombing run under such circumstances with little or no loss of accuracy.

Other objects, features, and advantages of this invention will suggest themselves to those skilled in the art and will become apparent from the following description taken in connection with the accompanying drawing in which.

The preferred embodiment of the invention herein described is intended to be used in conjunction with an airborne radio object detection apparatus in which a cathode ray tube indicator shows all reflecting objects within the range of said apparatus in a circular pattern, with the range of objects from the aircraft represented as radial distance from a center which may or may not be at the center of the cathode ray tube screen, and the azimuth of said objects represented as angular displacement from an arbitrary reference radius. This type of indication is referred to as plan position indication (P. P. I.). Such a combination of navigation apparatus and radio object detection apparatus is disclosed in the application by Britton Chance (R. L. No. 75–27), Serial No. 598,165, entitled "Electrical Apparatus," filed concurrently herewith on June 7, 1945.

This invention has four distinct but related functions which are designated hereinafter by the terms "navigate," "track," "bomb," and "course" in conformity with the markings on a function-control switch which is incorporated in the system. In order that they may be more clearly understood, these functions are briefly described after a preliminary explanation of the bombing geometry used in this invention.

Figures 1, 2:
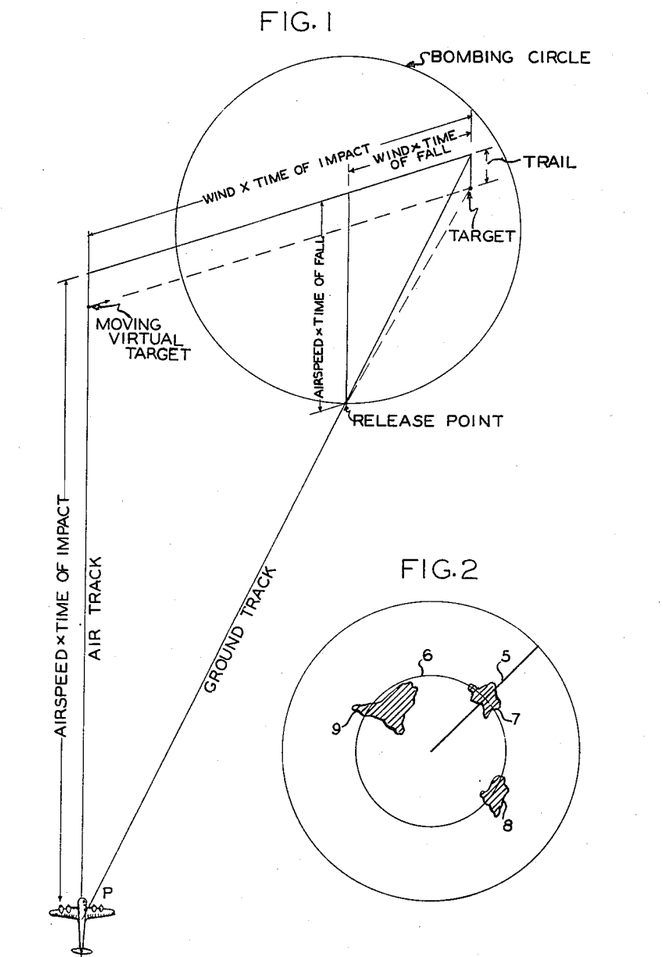
Fig. 1 is a diagram of the bombing geometry used in this invention.
Fig. 2 is a drawing of the cathode ray tube screen showing electronic cross-hairs produced by this invention.

Referring now more particularly to Fig. 1, the bombing circle is the locus of all points at which bombs may be released to strike the target when the aircraft is headed toward the center of the circle, under a given set of conditions of air-speed, wind-velocity and time-of-fall of the bombs being used. In the absence of wind, the bombing circle is centered on the target; when a wind is blowing, the center of the bombing circle is up-wind a distance equal to wind-velocity times time-of-fall.

Fig. 1 represents the conditions which obtain at any instant when the aircraft occupies a position P on its bombing run. The time interval from this instant until the instant of impact of the bombs is called time-of-impact. The time-of-impact therefore decreases continuously as the bombing run proceeds, until it becomes equal to time-of-fall at the instant of bomb release.

Since air resistance retards the motion of the bomb in a direction along the air-track of the aircraft, the aircraft will have traveled an additional distance called "trail" beyond the target when the bomb strikes.

In the bombing system herein described, the aircraft flies a straight ground-track, in the absence of evasive action (hence, also a straight air-track), in contrast to a bombing method wherein a curved ground-track may be flown. The compass heading is therefore constant, the aircraft being headed continuously toward a moving virtual target which travels with wind velocity and arrives at the center of the bombing circle when the aircraft reaches the periphery of the circle.

All positions of the function-control mentioned above cause a pair of mileage dials to indicate continuously the total east-west and north-south displacements from an arbitrarily selected origin of ground coordinates.

With the function-control in the "navigate" position, a pair of electronically produced indices or cross-hairs is shown on the P. P. I. These cross-hairs are bright traces as shown in Fig. 2, line 5 being a radial trace called an azimuth mark, and line 6 being a circular trace called the range mark. Shaded areas 7, 8, and 9 represent traces of objects on the ground. The cross-hairs intersect at and remain on the trace which represents the selected ground reference point, which may be the target; when two or more such traces, as for example 7 and 8, are similar in size and shape, the cross-hairs aid in identifying the desired target. In the event that the screen of the indicator tube shows a large number of bright traces representing ground objects, it may be preferable to make the cross-hairs dark traces instead of bright, to obtain better contrast.

A set of dials called "fix" dials give continuous indication of the east-west and north-south ground coordinates of the reference point with respect to the aircraft.

With the function-control in the "track" position, the cathode ray tube of the associated radio object detection apparatus presents only a sector of the total ground area beneath the aircraft, and the speed of the sweep is made inversely proportional to the ground range from the aircraft to the reference point or target. The effect of this sweep voltage is such that the trace of the reference point remains at a fixed range position on the cathode ray tube screen. The "track" function is normally used when approaching the designated target.

With the function-control in the "bomb" position, a meter called the pilot's direction indicator (P. D. I.) directs the pilot on a straight ground-track toward the moving virtual target described above. (The pilot is not required to fly this straight ground-track, however, except at the instant of bomb release.) An electronic circuit provides the pilot with a meter indication of the unelapsed time remaining before release of the bombs, called time-to-go (T. T. G.), and releases the bombs automatically when T. T. G. becomes zero. Provision is made for inserting the coordinates of an offset point with respect to the target in the event that the radio echo of the target is not sufficiently strong, or cannot be recognized or resolved. Electronic cross-hairs are not produced.

With the function-control in the "course" position, the system is used for step-by-step blind navigation, in which the fix dials are set to correspond to the coordinates of some ground reference point on the desired route. The P. D. I. then directs the pilot on a straight ground-track toward this point. The aircraft will actually be headed toward a point which travels with wind velocity toward the desired reference point and arrives there simultaneously with the aircraft, if the "trail" setting is zero. If the trail setting is not zero, an error equal in magnitude to trail is introduced, but this error is usually negligible for navigational purposes.

Figure 3:
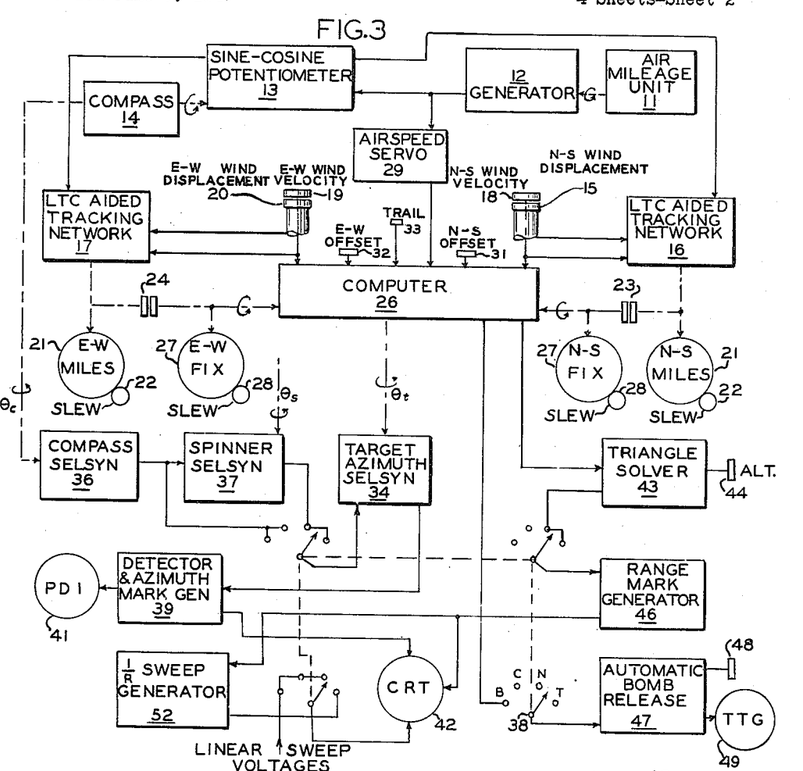
Fig. 3 is a block diagram of a system embodying the principles of this invention.

Referring now more particularly to Fig. 3, air mileage unit 11 may be any one of several well known devices, as for example a wind-driven propeller corrected for variations in air-density. The output from air mileage unit 11 is a shaft rotation whose speed is proportional to airspeed and which drives generator 12. Generator 12 may be of any type which will produce a voltage proportional to its speed. Its output voltage is fed to sine and cosine potentiometer 13.

The voltage proportional to airspeed may also be produced by any other means, such as a potentiometer adjusted in accordance with airspeed.

Compass 14 may be of any type which will produce a shaft angular position proportional to compass heading of the aircraft, for example a flux-gate compass. This shaft position is fed to sine and cosine potentiometer 13. This potentiometer resolves the voltage proportional to airspeed into east-west and north-south components in a manner described in the application by Edward F. MacNichol, Jr. (R. L. No. 63–89), Serial No. 598,158, entitled "Electrical Circuit, filed June 7, 1945, now abandoned. As set forth in this application, each of the potentiometers may comprise a rotatable card supporting a winding of fine wire from which the insulation has been removed along a circle. Voltage may be applied to the ends of the winding through a slip ring arrangement and the center of the winding may be grounded. Two separate brushes make contact with the winding at points displaced 90° along the circle. If D. C. potentials of equal magnitude and opposite polarity are connected between the input terminals and ground, the voltage at one of the brushes will vary sinusoidally as the card is rotated, and the voltage at the other brush will vary in the same manner but displaced 90°, or cosinusoidally.

The north-south and east-west components of voltage are fed to linear-time-constant aided-tracking networks 16 and 17 respectively. Corrections for north-south and east-west wind-velocity are introduced into these respective networks by knobs 18 and 19 which provide an initial setting for an assumed wind velocity so that the output shaft speeds are made proportional to the north-south and east-west ground-velocity components. When, during operation, it is found that the initial setting of wind velocity does not correspond to actual conditions, corrections for wind-produced displacements are introduced to the networks at knobs 15 and 20 respectively. Linear-time-constant aided-tracking networks 16 and 17 are described in the application by John W. Gray, William D. Green, Jr., and David Sayre (R. L. No. 63–90), Serial No. 598,160, entitled "Electrical Apparatus," filed June 7, 1945, now U. S. Patent No. 2,784,908. As described in this application, the north-south or east-west component of voltage is added to a voltage proportional to wind velocity in the same direction, and the resultant voltage is employed to drive a motor. The motor drives a generator which produces a voltage to balance the resultant wind velocity-airspeed voltage. A change in resultant voltage causes a change in motor speed and a consequent change in the generated voltage. Thus a closed servo loop is provided. The motor also drives an output shaft corresponding to the output shafts of networks 16, 17. Knobs 18 and 19 vary the voltage proportional to wind velocity. Knobs 15 and 20 drive auxiliary generators to produce additional input voltage which may be required to advance or retard the output shafts in the event that the previously inserted wind velocity voltage proves to be incorrect.

The shaft rotations from networks 16 and 17 are fed to mileage dials 21—21 respectively so that these dials indicate continuously the total north-south and east-west distances traveled from an arbitrary starting point.

The shaft rotations from networks 16 and 17 are fed also through clutches 23 and 24 to computer 26 and to north-south and east-west fix dials 27—27 respectively. Clutches 23 and 24 are provided in order to permit resetting of the fix dials without disturbing the total mileage dials, when the computer is approaching the limit of its range of continuous operation and it becomes necessary to select a new ground reference point. It will be obvious to those skilled in the art that the resetting of fix dials 27—27 might also be accomplished through the medium of differential gears in place of clutches 23 and 24.

The north-south and east-west mileage and fix dials 21—21 and 27—27 together with the clutches 23 and 24 and associated gear trains are described in the application by Ivan A. Greenwood, Jr. (R. L. No. 75–28), Serial No. 598,166, entitled "Electrical Apparatus," filed June 7, 1945, now abandoned. As described in this application, the fix and mileage indicators for a particular direction may comprise concentric dials—a center coarse mileage dial, then a vernier mileage dial, and finally a fix dial. Each dial may be provided with an appropriate scale. The dials may be driven at appropriate rates by gearing having the proper ratios. The mileage dials may indicate distance of the aircraft from the point of departure, while the fix dial may indicate distance of the aircraft from a fix point. In navigation, the former distance will normally increase as the aircraft proceeds toward a destination, while the latter distance will decrease as the fix point is approached. The initial reading of the mileage dials may be set by adjusting slew knob 22 in Fig. 3, and as described in the Greenwood application, a friction clutch or the like may be provided to isolate the mileage dials during manual adjustment. The fix dial may be set for succeeding fix points by adjusting slew knob 28. During this process, clutch 23 is disengaged to prevent changing the mileage dial settings.

The voltage proportional to airspeed produced by generator 12 is fed also to airspeed servo 29. Airspeed servo 29 is a follow-up mechanism, described in detail subsequently with reference to Fig. 4, which drives a variable resistor in such a manner that its resistance is inversely proportional to airspeed. This resistor is a portion of the electrical circuit of computer 26.

Additional items of information required for bombing, namely north-south and east-west offset, and trail are inserted into computer 26 by knobs 31, 32, and 33 respectively. Trail knob 33 may be equipped with one of a set of interchangeable dials, each of which is calibrated in altitude for a particular bomb type and indicating airspeed, so that it is merely necessary to set knob 33 to the altitude at which the bombing is to be performed. The north-south and east-west wind velocity information inserted at knobs 18 and 19 is also fed to computer 26. Computer 26 is described in the application by John W. Gray and Duncan MacRae, Jr. (R. L. No. 75-25), Serial No. 598,162, entitled "Electrical Apparatus," filed June 7, 1945, concurrently with this application, and now U. S. Patent No. 2,711,856. Its outputs are a shaft angular position proportional to azimuth of a ground reference point or target, an A.-C. voltage proportional in amplitude to ground-range of said ground reference point or target, and an A.-C. voltage proportional in amplitude to time-of-impact.

Computer 26 is preferably provided with switch sections, not shown, having positions for bombing, course, navigate, and track to correspond to the other switch sections shown and these may be ganged to the common control 38. Switch sections for this purpose are shown in detail in the copending computer application. With the computer 26 switched to the navigate or track positions the output shaft of the computer is at an angle $\theta_t$ corresponding to the azimuth of the target or reference point. In the course position the operation of the computer is modified so that the angular rotation corresponds to the direction to a travelling virtual location and in the bomb position the angular rotation corresponds to the direction to a travelling virtual target.

As set forth in the Gray and MacRae application, the shaft rotation inputs to the computer which correspond to the ground velocity components drive potentiometers across which alternating potentials are applied. A voltage is thus available at the tap of each potentiometer corresponding to a component of ground range. These voltages are applied to the orthogonal stator coils of a resolver, one of the rotor coils of which is arranged in a nulling servo loop. The output from the other rotor coil is thus the vector sum of the two input components and is an alternating potential corresponding to the ground range. The angle of this rotor coil corresponds to the azimuth of the target or reference point.

It can be shown that the time of impact is equal to the sum of the ground range of a target and the trail, divided by the airspeed. The trail may be inserted as an alternating potential in series with the resolver range voltage output, and a resistor in the output circuit may be adjusted in accordance with the airspeed so that the current in the output circuit is proportional to the time of impact. A voltage proportional to time of impact may be derived from an impedance through which this current flows.

The computer may be employed to produce the polar coordinates of a moving vertical target by inserting corrections for the wind velocity components. This may be accomplished by switching the circuits of the computer so that portions of the time of impact output voltage are fed back to the inputs of the resolver in accordance with the value of the respective wind velocity components. Reference point offset may be introduced by merely inserting the necessary correction voltages in the inputs to the resolver.

The shaft angular position proportional to target azimuth from computer 26 is fed to target-azimuth "Selsyn" 34, where, with the function control in position for "bomb" or "course," it is compared with the compass heading by means of compass "Selsyn" 36 which receives the compass heading as a shaft angular position from compass 14. With the function-control in the "navigate" or "track" position, the target azimuth is compared to the true azimuth setting of the radio object detection system antenna (spinner). This is accomplished by interposing spinner "Selsyn" 37 in the connection between "Selsyns" 34 and 36, in such a way that the angle between the spinner axis and the longitudinal axis of the aircraft is added to the compass heading angle. The detailed operation of "Selsyns" 34, 36, and 37 to produce angular comparisons will be obvious to those skilled in the art.

The output from "Selsyn" 34 is an A.-C. voltage whose amplitude is proportional to the sine of the angular difference between the true bearing of the moving virtual target and the compass heading of the aircraft, in the "bomb" and "course" functions, or to the sine of the angular difference between reference point azimuth and true spinner azimuth in the "navigate" and "track" functions. The means by which this voltage is obtained is explained in detail subsequently with reference to Fig. 5.

With function-control 38 in any of its four positions, the output voltage from target direction "Selsyn" 34 is fed to detector and azimuth-mark generator 39. One output from detector and azimuth-mark generator 39 is a D.-C. voltage whose magnitude is proportional to the angular difference between target direction and compass heading, and whose polarity is indicative of the algebraic sign of said angular difference. With function-switch 38 in the "bomb" and "course" positions this output is fed to pilot's direction indicator (P. D. I.) 41, which is a milliammeter whose deflection directs the pilot on a straight ground-track toward the moving virtual target or reference point.

A second output from detector and azimuth-mark generator 39 is a voltage consisting of a series of positive pulses which, when applied to cathode ray tube (C. R. T.) 42, produces a bright trace passing radially through the trace of the ground object being tracked. Detector and azimuth-mark generator 39 is described in detail subsequently with reference to Fig. 6.

The A.-C. output from computer 26, a voltage proportional to the ground range to the target, is fed to triangle solver 43 where it is combined with altitude entered by knob 44. Triangle solver 43 produces a D.-C. voltage proportional to slant range to the target and is described in the application by Warren G. Proctor (R. L. No. 63-56), Serial No. 580,020, entitled "Electrical Apparatus," filed Feb. 27, 1945, now Patent No. 2,600,264, issued June 10, 1952. As set forth in the Proctor patent, there is provided a harmonic-free constant amplitude alternating current source, from which are taken two outputs proportional respectively to the lengths of the two known sides of the triangle. One of these voltages is fed to a phase shifter consisting of a differentiator and an integrator so connected that the combined gain of the two is relatively independent of variations in frequency of applied voltage, and the output is shifted approximately 90° in phase with respect to the input. This output is fed through a push-pull arrangement to two detectors, while the other output from the alternating current source is fed to the same two detectors through a parallel arrangement. The output of these detectors is then combined in such a way that the resultant voltage is proportional to the arithmetical mean of the two detector input voltages. This latter arrangement compensates for incomplete phase shift, and the direct current voltage produced is then proportional to the length of the unknown side of the triangle being solved, i. e. the vector sum of the known sides.

In the "navigate" and "track" positions of function switch 38, the D.-C. voltage proportional to slant range from triangle solver 43 is applied to range mark generator 46 which produces a series of pulses each of which occurs at a time proportional to slant range after the beginning of each sweep on cathode ray tube 42. These range marks are produced at all azimuths so that a bright circle passing through the trace of the target on the screen of cathode ray tube 42 is produced. Range mark generator 46 will be described in detail subsequently, with reference to Figs. 7 and 8.

The A.-C. voltage proportional to time-of-impact from computer 26 is fed to automatic-bomb-release circuit 47 when function switch 38 is in the "bomb" position. Automatic-bomb-release circuit 47 is described in detail in the application by Richard K. Mosher (R. L. No. 75–26), Serial No. 598,164, entitled "Electrical Circuit," filed June 7, 1945, now abandoned, and compares the voltage proportional to the time-of-impact with a voltage proportional to time-of-fall adjusted manually by knob 48 and causes the bombs to be released when the time-of-impact equals the time-of-fall. Knob 48 may be equipped with a set of interchangeable dials calibrated in altitude, one for each bomb type and indicated airspeed, as was knob 33 of computer 26. Automatic bomb release circuit 47 also provides a voltage proportional to the difference between time-of-impact and time-of-fall to T. T. G. meter 49, which indicates to the pilot the time remaining before the instant of bomb release is reached.

As set forth in the Mosher application, the alternating voltage proportional to time of impact may be applied to the grid of a vacuum tube, while a positive D. C. voltage proportional to time of fall may be applied to the cathode of the tube. The two input voltages may of course be referred to the same reference potential (ground), and the plate voltage is substantially more positive than the cathode potential. The plate current is thus a function of the relative amplitudes of the input voltages and may be employed to operate a meter indicating time to go. The circuit is arranged so that when the two input voltages are equal, a relay is actuated to release the bomb.

When function switch 38 is in the "bomb," "course," and "navigate" positions, cathode ray tube 42 is supplied with sweep voltages from the associated radio object detection apparatus not shown, to produce the sweep pattern normally used in plan-position-indicator presentation. In the "track" position of function-switch 38, sweep voltages from 1/R sweep generator 52 are supplied to cathode ray tube 42 so that the trace of the target remains at a fixed position on the screen of cathode ray tube 42 the rate of rise of the sweep voltage reduced by generator 52 being in inverse proportion to the ground range R. 1/R sweep generator 52 is supplied with the output voltage of range-mark generator 46 for this purpose, and is described in the application by Amasa S. Bishop (R. L. No. 62–92), Serial No. 586,418, entitled "Electrical Apparatus," filed April 3, 1945, now U. S. Patent No. 2,715,182. As described in this application, the sweep voltage is obtained from the potential across a condenser which charges from a variable potential supply and is periodically discharged through an electron tube. The rate of rise of the sweep voltage is varied by controlling the potential of the supply in inverse proportion to the ground range. The supply potential for each sweep cycle is held by a clamping circuit to an amplitude determined by the time of occurrence of a range marker from generator 46 in Fig. 3.

Figure 4:
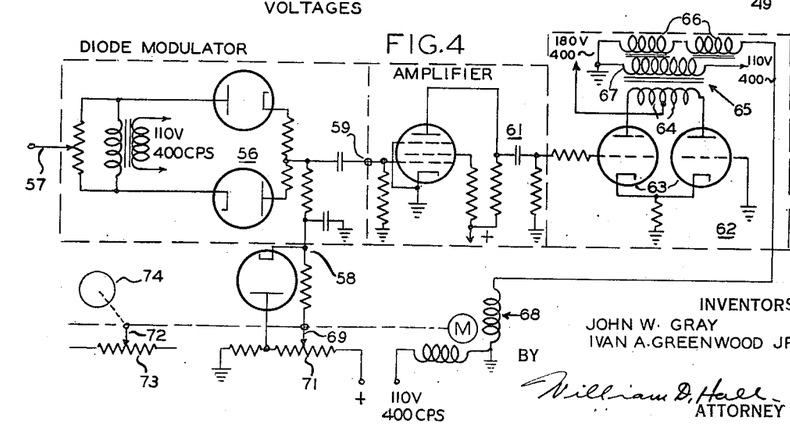
Fig. 4 is a schematic wiring diagram of the airspeed servo of Fig. 3.

Referring now more particularly to Fig. 4 for a detailed explanation of airspeed servo 29 of Fig. 3, the voltage proportional to airspeed from generator 12 is supplied to diode modulator 56, between input terminal 57 and ground. In the preferred embodiment herein described, the airspeed voltage is a D.-C. voltage. A second D.-C. potential is supplied between input terminal 58 and ground. Diode modulator 56 produces, between output terminal 59 and ground, a trapezoidal wave of voltage the amplitude of which is proportional to the potential difference between terminals 57 and 58, and whose phase is indicative of the polarity of said potential difference. Diode modulator 56 is described in the application by Albert M. Grass and Thaddeus W. Niemiec (R. L. No. 63–85), Serial No. 596,725, entitled "Electrical Circuit," filed May 30, 1945, now abandoned.

As set forth in this application, the diode modulator comprises a balanced bridge network having two arms consisting of rectifiers in series with resistances, and two arms consisting of the sections on opposite sides of the variable tap of a potentiometer. The potentiometer is shunted by the secondary of a transformer. If an unidirectional potential is applied between the junction of the first two arms (the junction of the resistors) and the tap on the potentiometer, and if a sinusoidal potential is applied to the transformer, an alternating trapezoidal wave output is obtained, the amplitude of which is proportional to the unidirectional voltage applied.

The trapezoidal wave of voltage at terminal 59 is amplified by pentode amplifier 61, which is conventional in design and whose operation will be obvious to those skilled in the art. The output voltage from amplifier 61, similar in wave form to the input voltage but inverted and increased in amplitude, is fed to circuit 62.

Circuit 62 comprises two triodes, 63—63, the plates of which are connected to the auxiliary winding 64 of transformer 65. Transformer 65 is of the type having a core with three legs, auxiliary winding 64 being on the center leg, and one of secondaries 66—66 and half of primary 67 on each outer leg. In the absence of signal from amplifier 61, the triodes 63—63 conduct equal currents during the half cycles in which their plates are positive with respect to ground, and the halves of auxiliary winding 64 carry equal currents, producing no magnetic effects in the core of transformer 65. In the presence of an alternating voltage from amplifier 61, triodes 63—63 conduct simultaneously on alternate half-cycles as before, but the current in one exceeds that in the other. Thus auxiliary winding 64 produces a flux which aids that in one outer leg and opposes that in the other so that the voltage induced in the secondary windings 66—66 are no longer equal, although still opposite, during the conducting period of triodes 63—63. The output voltage thus produced is therefore approximately represented as a half-wave rectified alternating voltage whose amplitude is approximately proportional to the magnitude of the input D.-C. voltage to diode modulator 56, and whose polarity is determined by the polarity of said input voltage.

The output from circuit 62 is fed to one winding of two-phase induction motor 68, the second winding of which is supplied continously from a 110-volt source which is approximately 90° out of phase with the fundamental component of the output voltage from circuit 62. Motor 68 thus rotates when there exists a potential difference between terminals 57 and 58, in a direction dictated by the polarity of said potential difference. Motor 68 drives the sliding contact 69 of potentiometer 71 in such a direction as to minimize the differential voltage input to terminals 57 and 58 of diode modulator 56.

In addition, motor 68 drives sliding contact 72 of variable resistor 73, which is a part of computer 26 of Fig. 3 and is described in the application previously cited.

Since the angular position of the rotor of motor 68 is a measure of airspeed, it also drives airspeed dial 74 to give a continuous indication of airspeed.

Figure 5:
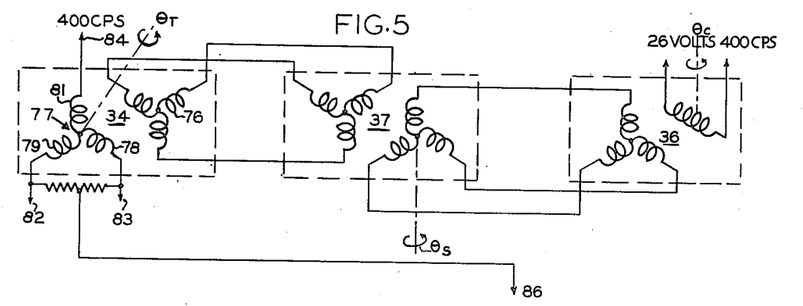
Fig. 5 is a schematic wiring diagram of certain "Selsyns" of Fig. 3.

Reference is made now more particularly to Fig. 5 for an explanation of "Selsyns" 34, 36, and 37 of Fig. 3 with function-switch 38 in the "navigate" or "track" position. "Selsyns" 36 and 37 cooperate to produce, in the air-gap of "Selsyn" 34, a magnetic flux whose direction is dictated by the sum of compass heading angle $\theta_c$ and the angle between spinner axis and aircraft axis $\theta_s$. As previously mentioned the detailed operation of "Selsyns"

36 and 37 to produce this result will be obvious to those skilled in the art.

The rotor 77 is so adjusted that, when $\theta_c+\theta_s$ is equal to the target azimuth $\theta_t$ as received from computer 26 of Fig. 3, the sum of voltages induced in rotor windings 78 and 79 is zero. However, another position of rotor 77, 180 electrical degrees from the position mentioned above, will also produce a zero resultant voltage in rotor windings 78 and 79. In both of these null positions, a voltage not equal to zero will be produced in winding 81, the phase of which will be opposite in the two cases. This voltage is then either added to or subtracted from an alternating voltage of constant amplitude applied at terminal 84, causing the A.-C. potential between terminal 86 and ground to be large at one of the nulls and small at the other.

This variation in magnitude of the voltage between terminal 86 and ground will be used to distinguish between the nulls of voltage between terminals 82 and 83, in a manner to be described. When function-switch 38 of Fig. 3 is in the "bomb" or "course" position, "Selsyn" 37 is eliminated so as to produce voltage nulls between terminals 82 and 83 when $\theta_c=\theta_t$.

Figure 6:
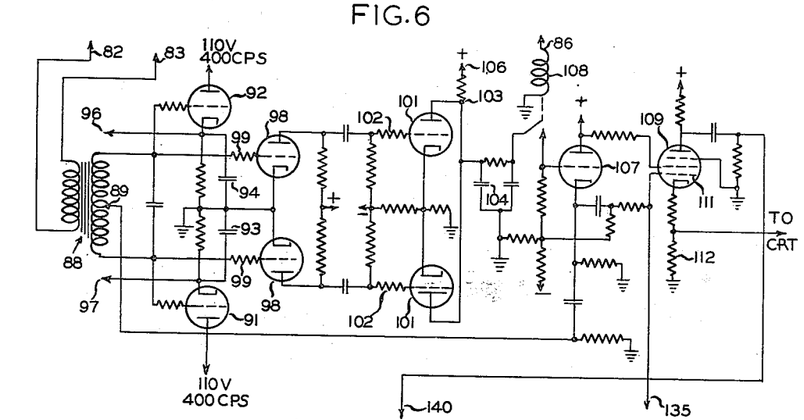
Fig. 6 is a schematic wiring diagram of the detector and azimuth-mark generator.

Referring now more particularly to Fig. 6 for an explanation of detector and azimuth-mark generator 39 of Fig. 3, voltage from terminals 82 and 83 of Fig. 5 is applied to corresponding terminals 82 and 83 of transformer 88. The secondary winding 89 of transformer 88 is connected to the grids of triodes 91 and 92, whose plates are supplied from a source of alternating potential. Since the voltages applied to the grids of triodes 91 and 92 are opposite in phase, only one of triodes 91 and 92 can conduct during a given direction of error in compass heading angle $\theta_c$, and then only on alternate half-cycles. Hence one of cathode condensers 93 and 94 will build up a net excess of potential over the other, and a milliammeter connected to terminals 96 and 97 as a P. D. I. will be given a deflection in accordance with the amount and direction of error in compass heading angle $\theta_c$.

The output voltage from transformer 88 is also fed to the vacuum-tube circuit comprising triodes 98—98 and 101—101. By virtue of the series grid resistors 99—99 and 102—102, the alternating input voltage is clipped on both positive and negative half-cycles to produce square-waves of plate-current in tubes 101—101. The detailed operation of the circuit to produce this result will be obvious to those skilled in the art. The square-waves of plate current are opposite in phase so that a substantially constant current flows through the common load resistor 103. Condenser 104 remains charged to a potential substantially less than the plate supply voltage to tubes 101—101, except that when the input voltage becomes zero, tubes 101—101 are driven to cutoff by the negative bias and condenser 104 charges up to the said supply voltage. Plate voltage is supplied to tubes 101—101 via terminal 106 only when function-switch 38 is in the "navigate" and "track" positions.

The wave form of voltage applied to the grid of tube 107 is thus a rectangular wave, the positive portion of which occurs at a time corresponding to equality of target azimuth $\theta_t$ and the sum of compass heading and spinner angle, $\theta_c+\theta_s$. In the "navigate" position of function switch 38, the ambiguous signal which would result from the input voltage becoming zero when the spinner or the aircraft is headed exactly away from the target is removed by relay 108. Relay 108 is operated by the voltage output at terminal 86 of Fig. 5.

Tube 107 conducts current only during the positive portions of the voltage between switch 108 and ground. Since tube 107 is connected as a cathode follower, the operation of which is obvious to those skilled in the art, the output wave form is not reversed. Tube 109, whose control grid 111 is fed from the cathode of tube 107, is also connected as a cathode follower, so that the output wave form across cathode resistor 112 due only to the input from tube 107 is a rectangular wave whose positive portion occurs at the proper time to produce a bright trace, namely the azimuth mark, passing radially through the trace of the target on the screen of the cathode ray tube indicator of the associated radio object detection apparatus. The signal from cathode resistor 112 is applied to the intensity grid of said cathode ray tube. The pulse voltage at the cathode of tube 107 is also fed, through condenser 110, to the center-tap of secondary winding 89 of transformer 88, in order to sharpen the azimuth mark pulses.

Figure 7:
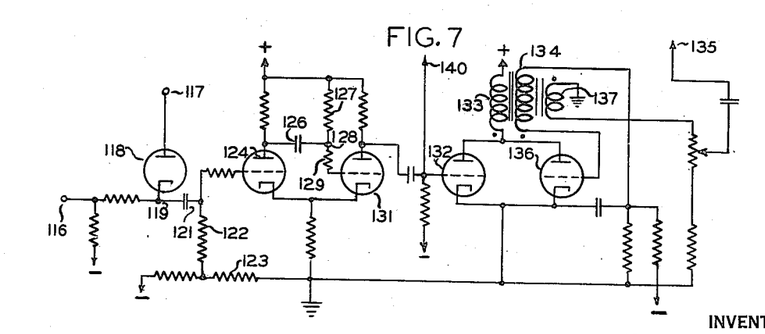
Fig. 7 is a schematic wiring diagram of the range-mark generator of Fig. 3.
Figure 8:
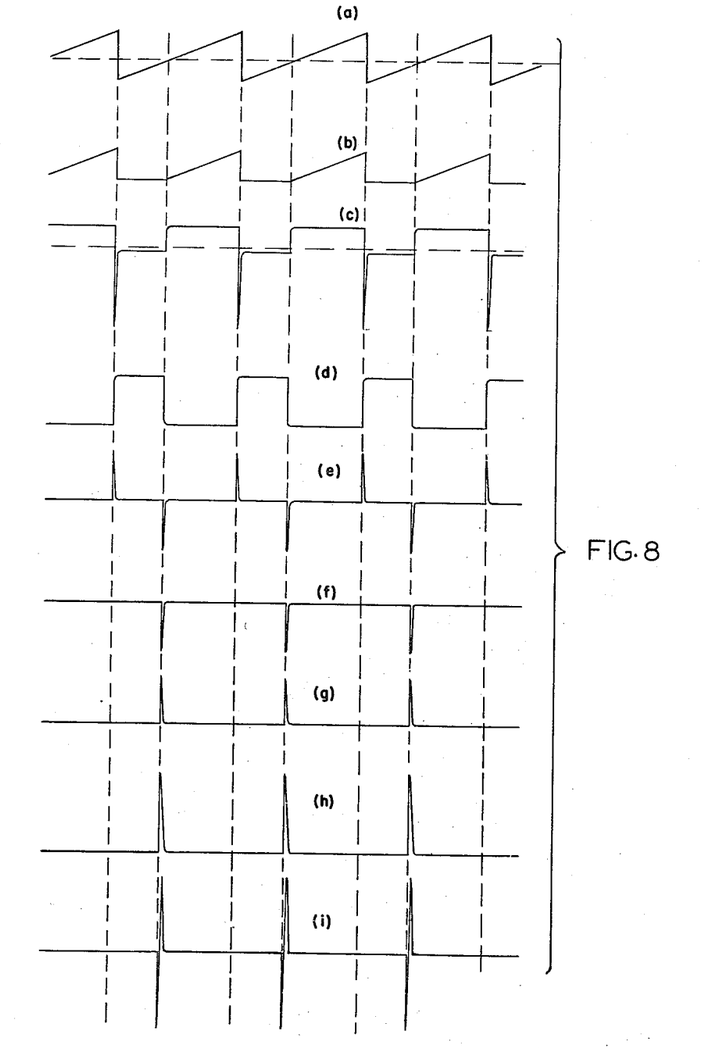
Fig. 8 is a series of voltage wave forms used in explaining the operation of the range-mark generator of Fig. 3.

Referring now more particularly to Fig. 7 for an explanation of range mark generator 46 of Fig. 2, the D.-C. voltage proportional in magnitude to the slant range of the target from triangle solver 43 of Fig. 3 is supplied at terminal 116. A sawtooth wave of voltage is applied at terminal 117. This sawtooth wave has a given amplitude and frequency. Diode 118 will conduct only during that portion of each cycle of the sawtooth wave when the plate is at a higher potential than the cathode, as shown in Fig. 8a, so that the voltage wave form at cathode 119 is as shown in Fig. 8b. Condenser 121 and resistors 122 and 123 are so proportioned as to form a peaking circuit, so that the wave form of voltage applied to the grid of tube 124 is approximately as shown in Fig. 8c.

Tube 124 has a fixed negative bias applied to it as shown, so that the plate-current cutoff is approximately represented by the dashed line of Fig. 8c, and the voltage wave form at the plate of tube 124 is that of Fig. 8d. Condenser 126 and resistor 127 are so proportioned as to form a peaking circuit, so that the wave form at junction 128 is represented in Fig. 8e. In the absence of signals applied to the grid of tube 131, the presence of resistor 129 in combination with the connection of resistor 127 to the positive plate-voltage source causes tube 131 to conduct its maximum current. This results in grid-clipping which removes the positive peaks of voltage in Fig. 8e, to make the wave form of voltage on the grid of tube 131 as shown in Fig. 8f.

The wave form of voltage appearing at the plate of tube 131 and at the grid of tube 132 is as shown in Fig. 8g, to produce a current wave form at the plate of tube 132 as shown in Fig. 8h. Each pulse of current in primary winding 133 of transformer 134 initiates a cycle of operation of the blocking oscillator comprising transformer 134 and tube 136. Blocking oscillators are well known in the art, an example being the circuit shown in Fig. 34a, p. 514, of "Radio Engineers Handbook" by F. E. Terman, McGraw-Hill, 1943.

Tube 136 is biased below plate-current cutoff so that it will oscillate only following a pulse of plate-current in tube 132. The output wave form is as shown in Fig. 8i, and is obtained at tertiary winding 137 of transformer 134. A variable fraction of said output voltage is applied through terminal 135, to control-grid 111 of tube 109 in Fig. 6, where it is mixed with the azimuth-mark signals previously described.

The operation of the range-mark circuit is suspended during the time that an azimuth mark is being produced, by means of a negative pulse obtained from the plate of tube 109 in Fig. 6 and applied via terminal 140 to the grid of tube 132 in Fig. 7.

In the operation of this invention for navigation and bombing the navigator determines, usually prior to the flight, the ground coordinates of the preselected target and of certain check-points or fixed along the proposed route. These coordinates are determined with respect to a specified initial point as origin from available maps or charts.

The navigator may also insert a preselected altitude at knob 44 of Fig. 3, trail at knob 33 and time-of-fall at knob 48, from tables prepared for the bombs to be used and the altitude at which they are to be released, or knobs 33 and 48 are also set to the preselected altitude, if equipped with the interchangeable dials mentioned previously. If it is known in advance that the designated target will not give an adequate radio echo, the offset coordinates of some nearby object which is a good reflector, are inserted at knobs 31 and 32.

When the aircraft is over the point of departure or the initial point, slew knobs 28—28 are adjusted to place the cross-hairs on the trace of the initial point and to set fix dials 27—27 on zero, and the mileage dials 21—21 are adjusted to read zero by means of slew knobs 22—22. Then, as the aircraft proceeds on its course, it is observed that the cross-hairs will drift off the said trace due to the effect of wind. Knobs 15 and 20 are then gripped to knobs 18 and 19 respectively and turned to bring the cross-hairs back to coincidence with the said trace. This automatically enters the correct windage rate so that the cross-hairs will thereafter remain fixed on the said trace.

As the flight proceeds, and it becomes necessary to change to a new fix-point, clutches 23 and 24 are momentarily disengaged and slew-knobs 28—28 are turned to set fix dials 27—27 to the predetermined coordinates of the fix-point. When this is done, the cross-hairs will automatically intersect upon the trace of this fix point on the indicator, thereby identifying it positively.

If, during the course of the flight it becomes impossible for the pilot to see the ground, the function control may be turned to the "course" position. This causes the P. D. I. to direct the pilot on a straight ground track between successive fix-points. Since the electronic cross-hairs are not produced in this function, it is necessary that the navigator return the system to the "navigate" function for short intermittent intervals to allow resetting on successive fix-points, and to recheck the wind-velocity corrections.

When the aircraft reaches the vicinity of the target, the function switch is thrown to the "track" position, in order that the sector presentation of information on the indicator may be more accurately observed. The target coordinates or reference point coordinates, if offset is used, are set into the fix dials in the same manner as were the fix-point coordinates. After the windage rate and other items of information have been checked, the function-switch is thrown to "bomb" and the pilot is thereafter directed by the P. D. I. until the T. T. G. meter reads zero and the bombs are automatically released. During the period of flight directed by P. D. I. prior to release of the bombs, the pilot may take any evasive action to avoid enemy anti-aircraft fire and fighter aircraft, or for any other reason, the only requirement being that at the instant of bomb release the aircraft be flying along a horizontal path on the P. D. I. course at the altitude set into the computer, and at the predetermined indicated airspeed.

While there has been described what is at present considered to be the preferred embodiment of this invention, it will be obvious to those skilled in the art that various changes and modifications may be made therein without departing from the scope of the invention as set forth in the appended claims.

The invention claimed is:

1. An aircraft navigation and bombing system comprising means for continuously measuring air speed and azimuthal heading direction of the craft, means responsive to voltages proportional to azimuthal components of airspeed from said measuring means comprising aided target marker tracking circuit means for generating azimuth components of ground range, said tracking circuit including means for introducing an initial setting for a tracking rate corresponding to an assumed wind velocity and a setting correction for wind velocity, means for setting the magnitudes of said ground range components to correspond to a chosen location on the ground, means for providing a control effect which varies inversely with air speed, a computing means responsive to said ground range vector components and adjustable in accordance with components of wind velocity and said air speed control effect for producing polar components of range and direction to a travelling virtual location up wind from said chosen location and for producing a potential proportional to the time to travel at said air speed to said virtual location, and means for comparing said polar component of direction with the heading direction of said craft to indicate by their difference any error in steering said craft toward said virtual location whereby said craft may be piloted to travel a straight line path to said chosen location.

2. A navigation and bombing system in accordance with claim 1 which further includes means for introducing in said computing means components representing the offset location of a target relative to said chosen location and a component corresponding to trail of a bomb which is to be dropped, effectively to modify the operation of said computing means correspondingly to modify said polar components of range and direction to those of a travelling virtual target and correspondingly to modify said potential to be proportional to the time of impact of said bomb at said target and means for comparing said time of impact with a potential representing time of fall of the bomb to indicate by their difference the time to go and means for automatically releasing said bomb when said time to go is zero.

3. A system according to claim 1 further comprising means for deriving the target slant range from said polar range component, a range mark generator, means for supplying a voltage to said range marker generator proportional to said slant range for producing a range marker the occurrence in time of which corresponds to said slant range, an oscilloscope fed from said range marker generator for displaying said marker, and means for providing a sweep voltage to said oscilloscope.

4. A system according to claim 3, wherein said sweep voltage providing means comprises a circuit for providing a sweep voltage to said oscilloscope which varies in inverse proportion to the ground range of the target.

5. An aircraft navigation and bombing system comprising means for continuously measuring air speed and azimuthal heading direction of the craft, means responsive to voltages proportional to components of airspeed from said measuring means comprising a pair of aided target marker tracking circuits for generating azimuthal rectangularly coordinate vector components of ground range, said tracking circuits including means for introducing an initial setting for a tracking rate corresponding to an assumed wind velocity and a setting correction for wind velocity, means for setting the magnitudes of said ground range components to correspond to a chosen location on the ground, means for providing a control effect which varies inversely with air speed, a computing means responsive to said ground range coordinate vectors and adjustable in accordance with coordinate components of wind velocity and said air speed control effect for producing polar components of range and direction to a travelling virtual target up wind from said chosen location by a distance and direction corresponding to the wind velocity vector multiplied by the time to travel at said air speed to said virtual location and for producing a potential proportional to said time and means for comparing said polar component of direction with the heading direction of said craft to indicate by their difference any error in steering said craft toward said virtual location whereby said craft may be piloted to travel a straight line path to said chosen location.

6. A navigation and bombing system in accordance with claim 5 which further includes means for introducing in said computing means components representing the offset location of a target relative to said chosen location and a component corresponding to trail of a bomb which is to be dropped, effectively to modify the operation of said computing means correspondingly to modify said polar components of range and direction to those of a travelling virtual target and correspondingly to modify said potential to be proportional to the time of impact of said bomb at said target and means for comparing said time of impact with a potential representing time of fall of the bomb to indicate by their difference the time to go and means for automatically releasing said bomb when said time to go is zero.

7. An aircraft navigation and bombing system comprising means for continuously measuring air speed and azimuthal heading direction of the craft, means for determining the polar components of range and direction to a chosen location on the ground, means responsive to voltages proportional to components of air speed from said measuring means comprising aided target marker tracking circuit means for generating azimuthal components of ground range, said tracking circuit including means for introducing an initial setting for a tracking rate corresponding to an assumed wind velocity and a setting correction for wind velocity, means for setting the magnitudes of said ground range components relative to said chosen location, means for providing a control effect which varies inversely with air speed, a computing means responsive to said ground range vector components and adjustable in accordance with components of wind velocity and said air speed control effect, switching means which in one position provides for operating said computing means independently of said wind velocity component and said air speed control effect to produce polar components of range and direction to said chosen location together with means for comparing said computed polar components with said determined polar components to guide the adjustment in said tracking circuits of said corrections for wind velocity and which in a second position provides for operating said computing means with said wind velocity components and said control effect for producing polar components of range and direction to a travelling virtual location up wind from said chosen location and for producing a potential proportional to the time of travel at said air speed to said virtual location, and means for comparing said polar component of direction with the heading direction of said craft to indicate by their difference any error in steering said craft toward said virtual location whereby said craft may be piloted to travel a straight line path to said chosen location.

8. A navigation and bombing system in accordance with claim 7 which further includes means for introducing in said computing means components representing the offset location of a target relative to said chosen location and a component corresponding to trail of a bomb which is to be dropped, effectively to modify the operation of said computing means for a third position of said switching means correspondingly to modify said polar components of range and direction to those of a travelling virtual target and correspondingly to modify said potential to be proportional to the time of impact of said bomb at said target and means for comparing said time of impact with a potential representing time of fall of the bomb to indicate by their difference the time to go and means for automatically releasing said bomb when said time to go is zero.

References Cited in the file of this patent

UNITED STATES PATENTS

| | | |
|---|---|---|
| 2,479,909 | Darlington | Aug. 23, 1949 |
| 2,480,208 | Alvarez | Aug. 30, 1949 |
| 2,488,448 | Townes | Nov. 15, 1949 |

FOREIGN PATENTS

| | | |
|---|---|---|
| 164,765 | Great Britain | June 23, 1921 |